(12) United States Patent
Spicola, Jr.

(10) Patent No.: US 8,588,476 B1
(45) Date of Patent: Nov. 19, 2013

(54) SYSTEMS FOR DETERMINING ANIMAL METRICS AND RELATED DEVICES AND METHODS

(71) Applicant: ClicRWeight, LLC, Tampa, FL (US)

(72) Inventor: Joseph A. Spicola, Jr., Tampa, FL (US)

(73) Assignee: Clicrweight, LLC, Tampa, FL (US)

( * ) Notice: Subject to any disclaimer, the term of this patent is extended or adjusted under 35 U.S.C. 154(b) by 0 days.

(21) Appl. No.: 13/832,109

(22) Filed: Mar. 15, 2013

Related U.S. Application Data (60) Provisional application No. 61/656,057, filed on Jun. 6, 2012, provisional application No. 61/655,303, filed on Jun. 4, 2012, provisional application No. 61/751,528, filed on Jan. 11, 2013.

(51) Int. Cl.
*H04N 7/18* (2006.01)

(52) U.S. Cl.
USPC ............................................ 382/110; 348/61

(58) Field of Classification Search
USPC ............................................ 348/61; 382/110
See application file for complete search history.

(56) References Cited

U.S. PATENT DOCUMENTS

| | | |
|---|---|---|
| 4,296,918 A | 10/1981 | Holscher |
| 4,498,424 A | 2/1985 | Leuschner |
| 4,745,472 A | 5/1988 | Hayes |
| 4,963,035 A | 10/1990 | McCarthy et al. |
| 5,412,420 A | 5/1995 | Ellis |
| 5,474,085 A | 12/1995 | Hurnik et al. |
| 5,483,441 A | 1/1996 | Scofield |
| 5,576,949 A | 11/1996 | Scofield et al. |
| 5,944,598 A | 8/1999 | Tong et al. |
| 6,377,353 B1 | 4/2002 | Ellis |
| 6,549,289 B1 | 4/2003 | Ellis |
| 6,678,396 B2 | 1/2004 | Bartle |
| 6,974,373 B2 | 12/2005 | Kriesel |
| 7,039,220 B2 | 5/2006 | Kriesel |
| 7,128,024 B2 | 10/2006 | Doyle, II |
| 7,158,915 B2 | 1/2007 | Wargon |
| 7,310,431 B2 | 12/2007 | Gokturk et al. |
| 7,399,220 B2 | 7/2008 | Kriesel et al. |
| 7,450,783 B2 | 11/2008 | Talapov et al. |

(Continued)

FOREIGN PATENT DOCUMENTS

| | | | |
|---|---|---|---|
| WO | 2003/039247 A1 | 5/2003 | |
| WO | 2012/040782 A1 | 4/2012 | |

OTHER PUBLICATIONS

Brandl, Nabil et al.; Determination of Live Weight of Pigs From Dimensions Measured Using Image Analysis; Jan. 1, 1996; Computers and Electronics in Agriculture 15 (1996) 57-72; Elsevier, 1996.

(Continued)

*Primary Examiner* — Sath V Perungavoor
*Assistant Examiner* — Jeffery Williams
(74) *Attorney, Agent, or Firm* — Proskauer Rose LLP (57) ABSTRACT

In some aspects, an animal positioning system can include a first positioning member; and a second positioning member positioned relative to the first positioning member configured to limit an available spacing along a floor surface between the first positioning member and the second positioning member. The second positioning member is typically arranged at an angular bias away from the first positioning member relative to a floor surface and is configured to permit unobstructed viewing of a body of an animal positioned in the available spacing.

30 Claims, 8 Drawing Sheets

(56) References Cited

U.S. PATENT DOCUMENTS

| | | |
|---|---|---|
| 7,603,284 B2 | 10/2009 | Stroman et al. |
| 7,809,193 B2 | 10/2010 | Iwasaki et al. |
| 7,853,046 B2 | 12/2010 | Sharony |
| 8,233,873 B2 | 7/2012 | Principe et al. |
| 8,351,656 B2 | 1/2013 | Spicola et al. |
| 8,355,885 B2 | 1/2013 | Krien |
| 2005/0211174 A1* | 9/2005 | Ellis .......................... 119/14.08 |
| 2011/0125062 A1 | 5/2011 | Mulder |
| 2011/0279650 A1 | 11/2011 | Liao et al. |
| 2012/0275659 A1 | 11/2012 | Gomas et al. |

OTHER PUBLICATIONS

Wang, Y, Abstract: Walk-through weighing of pigs using machine vision and an artificial neural network, Biosystems Engineering, May 2008, pp. 117-125, vol. 100, Issue 1, United States.

* cited by examiner

SYSTEMS FOR DETERMINING ANIMAL METRICS AND RELATED DEVICES AND METHODS

RELATED APPLICATIONS

This application claims the benefit of U.S. Provisional Patent Application Ser. No. 61/656,057 filed Jun. 6, 2012, entitled "Method and System for Determining Livestock Metrics," U.S. Patent Application Ser. No. 61/655,303 filed Jun. 4, 2012 entitled "Determining Weight of an Animal Based on an Image," U.S. Patent Application Ser. No. 61/751, 528 filed Jan. 11, 2013, entitled "Method and System for Determining and Displaying Livestock Metrics," and U.S. patent application entitled "Method and System for Determining and Displaying Livestock Metrics," identified by Ser. No. 13/832,186, and filed this same day herewith. The contents of these applications are hereby incorporated herein by reference in their entirety.

TECHNICAL FIELD

This application relates generally to livestock management, and more particularly to systems for determining animal (e.g., livestock animals) metrics and related devices and methods.

BACKGROUND

Various chute systems are utilized on farms for directing or positioning animals to measure animal characteristics (e.g., size or weight) and to sort animals based upon the measured characteristics. Selection of particular sorting pens for animals exiting the chute system, based on the measurements obtained within the chute system, can be used to place individual animals with particular, measured characteristics and known information into a sorting pen with other animals having similar characteristics. Sorting the animals in this way can enable a feedlot manager to apply various regimens of feed, growth fluids, and the like to particular animals or groups of animals depending on their age, breed, sex, skeletal structure, or other characteristics. That is, animals sorted into various groups can be fed similar (or the same) rations so that they efficiently and effectively obtain substantially the same tissue composition. In certain conventional systems, chutes can include a weight scale in the floor adapted for use with an existing weight scale.

SUMMARY

In some aspects, an animal positioning system can include a first positioning member; and a second positioning member positioned relative to the first positioning member configured to limit an available spacing along a floor surface between the first positioning member and the second positioning member, the second positioning member being arranged at an angular bias away from the first positioning member relative to a floor surface and being configured to permit unobstructed viewing of a body of an animal (e.g., a livestock animal) positioned in the available spacing.

Embodiments can include one or more of the following features.

In some embodiments, the positioning system is configured to permit the animal to voluntarily enter and exit the available spacing. In some cases, the positioning system can be open-ended.

In some embodiments, the first positioning member includes a first wall structure and the second positioning member includes a second wall structure. In some cases, the second wall structure is positioned at an angular bias away from the first wall structure relative to the floor surface to permit the unobstructed viewing of the body of the animal positioned in the available spacing. In some cases, the second wall structure includes a plate-like element configured to limit the animal from traversing the second wall structure. In some cases, the angular bias includes the second wall structure being arranged at an angle that is 100 degrees to 145 degrees relative to the floor surface. For example, the angular bias can include the second wall structure being arranged at an angle that is 120 degrees to 135 degrees relative to the floor surface.

In some embodiments, a positioning of a lower region of the first sidewall relative to a lower region of the second sidewall limits more than one animal from entering the chute system at a particular time. In some cases, a spacing between the lower region of the first sidewall and the lower region of the second sidewall is associated with a typical width of a type of animal entering the chute system. In some cases, the positioning of the lower portion of the first sidewall relative to the lower portion of the second sidewall limits the animal's ability to position itself relative to an imaging device of the positioning system. In some cases, the animal's limited ability to position itself relative to the imaging device enables the imaging device to capture an unobstructed side view image the body of the animal.

In some embodiments, the animal positioning system also includes an imaging system configured to capture an image (e.g., a three dimensional image) of the body of the animal positioned in the available spacing via the unobstructed viewing. In some cases, the animal positioning system also includes a control system in communication with the imaging system. In some embodiments, the animal positioning system also includes an animal detection system configured to determine that the animal is positioned in the available spacing for imaging by the imaging system. In some cases, the animal detection system includes one or more components of the imaging system. In some cases, the animal detection system includes a device configured to be activated by the animal feeding from the device.

In some embodiments, the animal positioning system also includes an animal identification system configured to identify the animal positioned in the available spacing based on an identifying feature associated with the animal. In some cases, the animal identification system includes a wireless data reading device. In some cases, the wireless data reading device comprises a device to read data from an RFID tag.

In some embodiments, the animal positioning system also includes an animal injection system configured to administer a substance to the animal.

In some embodiments, the animal positioning system also includes an animal marking system configured to apply a mark to the animal associated with a characteristic of the animal.

In some cases, the animal marking system includes a device configured to apply an identifying marking to the animal. In some cases, the device configured to apply the identifying marking includes a printer device.

In some aspects, a livestock animal chute can include a frame structure; an animal positioning area defined by: i) a first sidewall of the frame structure; and ii) a second sidewall of the frame structure disposed relative to the first sidewall, the second sidewall being angled relative to a floor surface to enable a field of view of the animal positioning area; an animal detection system configured to determine when an animal is positioned in the animal positioning area; an imaging system positioned relative to the frame structure configured to capture an image of an animal in the animal positioning area; and a control system configured to i) operate the imaging system and the animal detection system and ii) estimate a weight of the animal based on the image captured by the imaging system.

In some aspects, a method for estimating a characteristic associated with an animal (e.g., a livestock animal) can include determining the animal's presence within a target area of an animal positioning system having a first positioning member and a second positioning member; responsive to determining the animal's presence within the target area, capturing an image of the animal; and processing the image to estimate the characteristic associated with the animal.

Embodiments can include one or more of the following features.

In some embodiments, the characteristic includes a weight of the animal.

In some embodiments, the second positioning member is arranged at an angular bias away from the first positioning member relative to a floor surface.

In some embodiments, the method also includes identifying the animal according to identifying information associated with the animal.

In some embodiments, the method also includes, responsive to determining that the characteristic meets a threshold characteristic level, administering a substance to the animal. In some cases, administering a substance includes injecting the animal with a substance.

In some embodiments, the method also includes, responsive to determining that the characteristic meets a threshold characteristic level, applying an identifying mark to the animal. In some cases, applying the identifying mark includes applying a barcode mark.

"Animals" as used herein can include any of various members of the animal kingdom including, but are not limited to, livestock animals (e.g., cattle, swine, sheep, goats, birds including chicken, duck or turkey, or other animals), other wild animals, such as those that can inhabit zoos (e.g., felines (e.g., lions, tigers, leopards, jaguars, or other feline animals), wild dogs (e.g., foxes, dingoes, wolves, coyotes, jackals, or other types of wild dogs), ungulates (e.g., pigs, horses, zebras, giraffes, deer, antelope, gazelles, moose, or other ungulate (e.g., hooved) animals), primates (e.g., monkeys, chimpanzees, orangutans, gorillas, or other primate animals), birds (e.g., ostriches, emus, gamebirds, waterfowls, penguins, flamingos, storks, herons, birds of prey, or other types of birds)), domesticated animals including cats and dogs, or any of various other animals including different types of bears, rhinos, hippopotamus, elephants, kangaroos, or various other types of animals.

In some aspects, the chute system includes a control wall having an animal feeder and an animal presence indicator, a substantially vertical wall adjacent to the control wall, an angled wall opposite the vertical wall and adjacent the control wall, an imaging device having a field-of-view substantially unobstructed by the angled wall, an opening configured for animal entrance and exit, and a control system communicatively connected to the animal presence indicator and the imaging device, and configured to control the imaging device based upon information communicated by the animal presence indicator.

Embodiments can include one or more of the following advantages.

In some embodiments, the chute systems described herein can permit effective and accurate animal characteristic detection (e.g., estimation or prediction) in a manner that is less expensive and/or more efficient than certain other chute systems. For example, chute systems having scales can be expensive and inefficient as the scales can require a time delay (e.g., a delay to zero the sinusoidal movement of the scale). Such extra time needed to capture an accurate weight measurement can result in animals (e.g., pigs) entering and exiting a chute without the weight accurately being measured. That is, even if an animal stops on a scale, minor movements of the animal (e.g., as if the animal shifts its weight and moves on top of the scale) can shift and alter a weight reading, resulting in an inaccurate measurement. Further, scales can become corroded (e.g., corroded with farm debris), rendering increasingly inaccurate measurements, which can result in incorrect or inaccurate animal sorting. Some of these problems can be alleviated using the systems and methods described herein.

Additionally, in some embodiments, the systems and methods described herein enable animal characteristic detection (e.g., estimation or prediction) in a manner than is less expensive and/or more efficient than certain other systems utilizing visual techniques (e.g., camera systems). In some cases, as a result of the chute systems described herein being able to consistently direct (e.g., position) an animal within the chute system, less expensive or more efficient visual systems (e.g., camera and visual software systems) can be used to determine the animal's weight.

DETAILED DESCRIPTION

The chute systems described herein can enable consistent and repeatable positioning of an animal so that an image (e.g., a three-dimensional image) can be taken of the animal to determine any of a variety of characteristics of the animal (e.g., weight).

Figure 1:
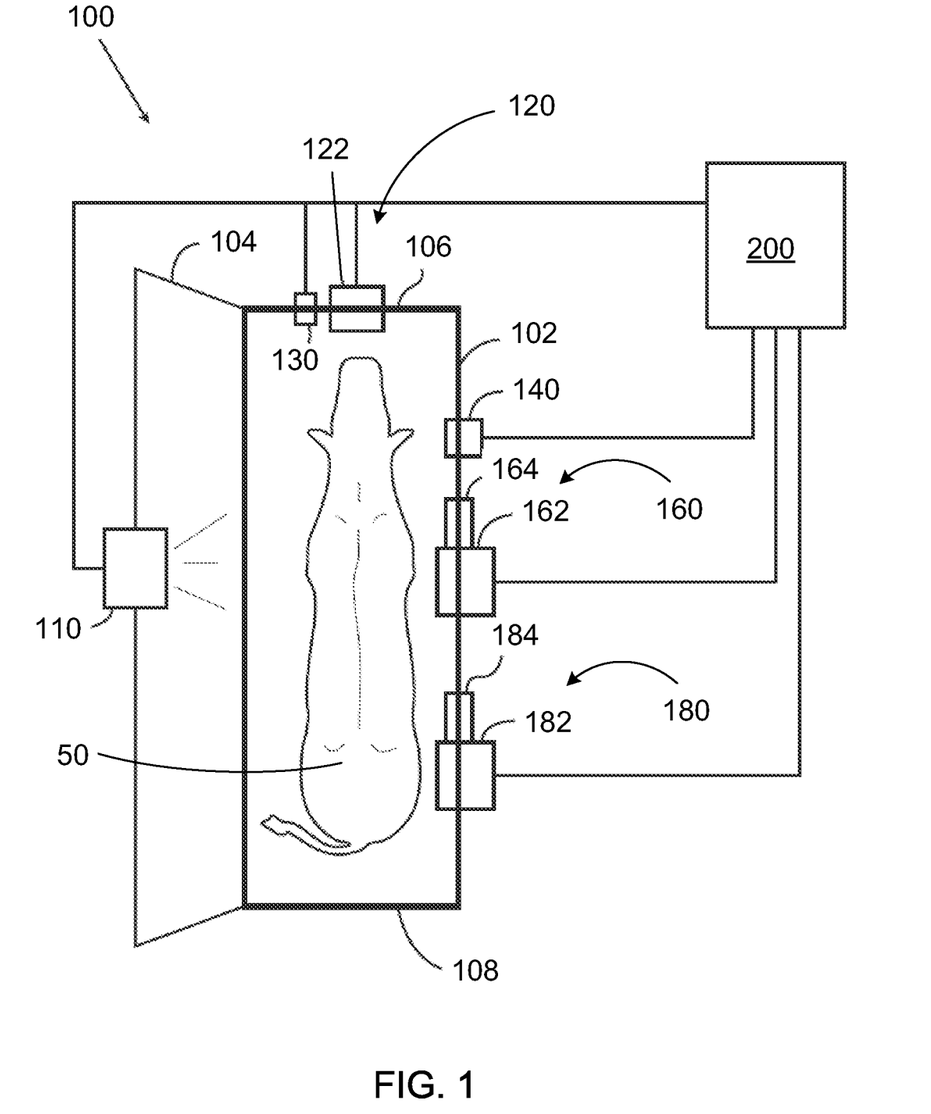
FIG. 1 is a top, schematic view of an example chute system for consistently positioning an animal for determining and measuring metrics associated with the animal.
Figure 2:
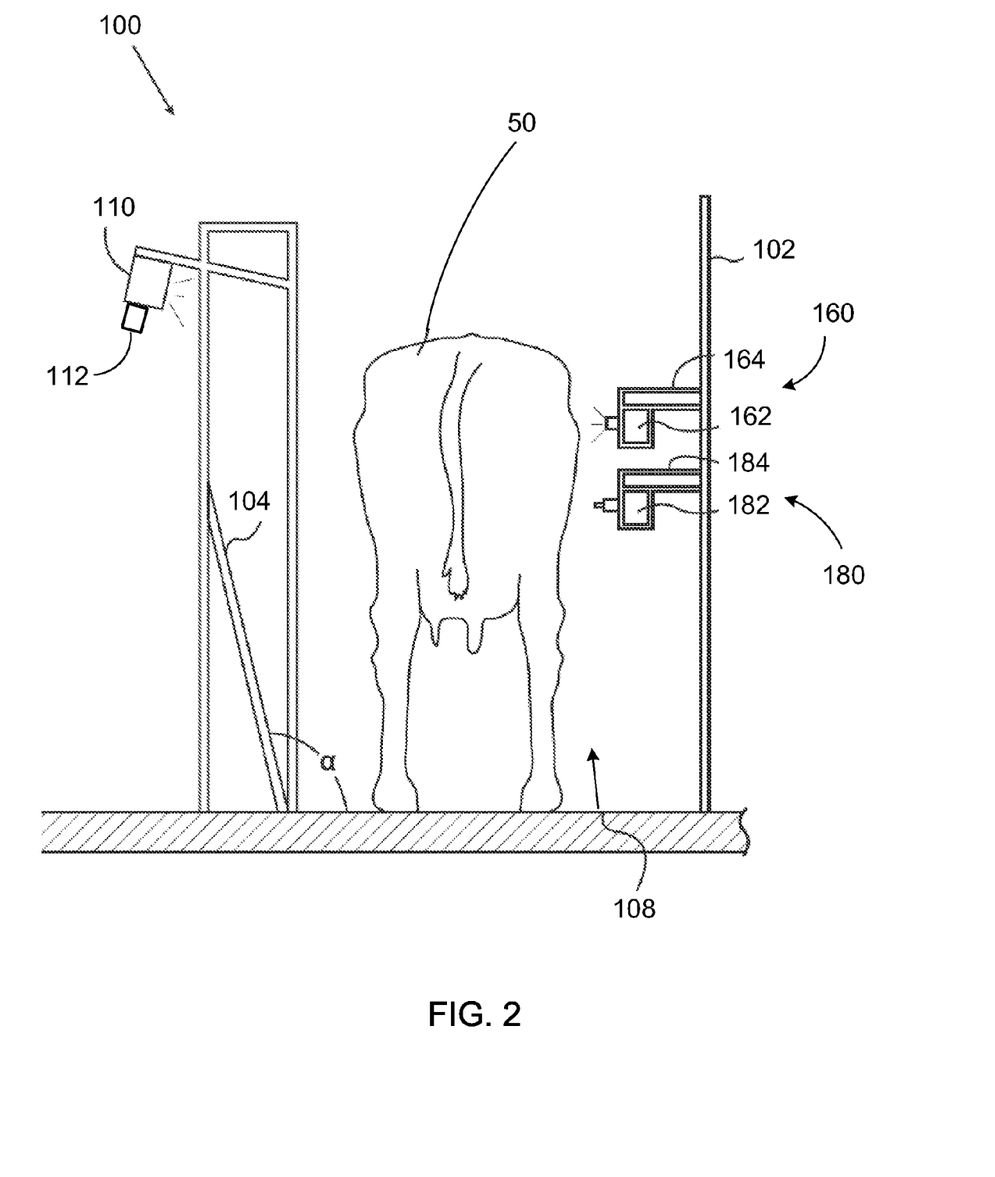
FIG. 2 is a front, schematic view of the chute system of FIG. 1.
Figure 3:
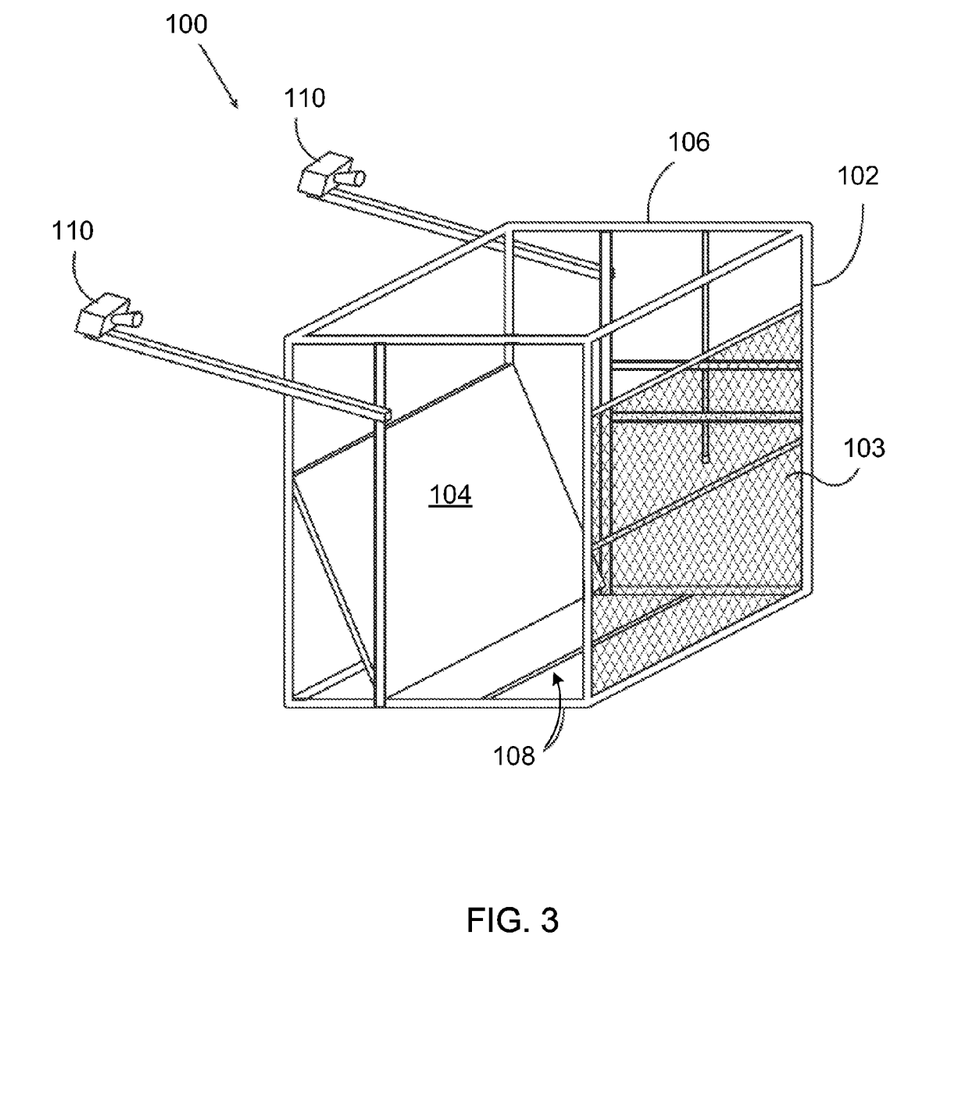
FIG. 3 is a perspective view of an example chute system having multiple imaging systems.

Referring to FIGS. 1-3, an animal positioning system (e.g., a chute system) 100 for positioning an animal (e.g., a livestock animal, such as a pig, a cow, or another animal) for analysis (e.g., determining and measuring metrics associated with an animal) can be a closed-ended chute. That is, the chute system 100 can be configured to allow an animal (e.g., only one animal) 50 to voluntarily enter and stand within the chute system for analysis and then exit the chute system (e.g., after being analyzed). For example, the animal can typically enter and exit the chute system through one (only one) entryway.

As illustrated, in some embodiments, the chute system 100 includes a frame structure that is formed of a generally rectangular framework having one or more wall structures including a datum structure (e.g., a first sidewall) 102, a positioning member (e.g., a second sidewall) 104, and an end, control wall 106 disposed at an end of the chute system that generally forms an end boundary between the first sidewall 102 and the second sidewall 104. That is, in some aspects, the first sidewall 102 is used as a datum structure along which the animal can be positioned within the chute system, and the other components of the chute system are positioned relative to the datum structure for properly positioning and imaging the animal. Use of such a datum structure in this manner helps to more easily and more consistently position the animal within the chute system.

A chute entryway 108 is positioned at an end of the chute system 100 opposite the control wall 106 so that animals can enter and exit the chute system 100. In some embodiments, the entryway 108 includes a door configured to open manually or automatically (e.g., when an animal approaches the chute system 100). Alternatively, in some embodiments, the entryway 108 is in the form of an opening (i.e., without a door) through which the animals can enter and exit the chute system 100.

The frame structure can be of various sizes based on the type of animals with which the chute system will be used. For example, for some types of pigs, the frame structure can be about 20 inches wide (i.e., the entryway 108 can be about 20 inches wide) and about two feet tall.

The second sidewall 104 typically includes a visual analysis system (e.g., an imaging system) 110 attached thereto for analyzing an animal positioned within the chute system 100. As discussed herein, the imaging system 110 can be configured to capture an image of the animal in order to determine characteristics of the animal (e.g., size or weight of the animal).

As illustrated, particularly with respect to FIGS. 2 and 3, the second sidewall 104 is typically angled (i.e., angled away from the first sidewall 102) to enable the imaging system 110 to better capture a side view of the animal. For example, the second sidewall 104 is angled so that a lower portion of the second sidewall 104 can be positioned close enough to a lower portion of the first sidewall 102 to properly position the animal, for example, by limiting (e.g., restricting) the available floor space on which the animal can stand within the chute system 100. That is, when an animal walks into the entryway 108, the spacing between the lower portion of the second sidewall 104 and the lower portion of the first sidewall 102 directs or guides (e.g., as a result of the limited floor space) into a consistent, desired location that is preferred for imaging the animal. As discussed below, the consistent positioning of animals within the chute system 100 by the second sidewall 104 can help to enable the imaging system 110 to consistently capture images of different animals so that the different animals can be compared to one another (e.g., for further processing). For example, in some embodiments, the spacing between the lower portion of the first sidewall and the lower portion of the second sidewall is about 10 inches to about 24 inches (e.g., about 12 inches to about 18 inches), depending on the type of animal with which the chute system is being used. As discussed below, in some embodiments in which the chute system is used to position pigs, the spacing between the lower portion of the first sidewall and the lower portion of the second sidewall is about 12 inches to about 16 inches (e.g., about 14 inches to about 15 inches (e.g., about 14.19 inches)).

The second sidewall 104 is typically sloped (e.g., sloped at an angle α relative to the spacing on which the animal is intended to stand) so that while the lower portion of the sidewall 104 remains closer to the first sidewall 102 to position the animal as described above, an upper portion of the second sidewall 104 is angled away from the animal so that it is substantially out of the field-of-view of the imaging system 110. Since it can be useful for the imaging system 110 generally used to capture a side view image of most of the animal (e.g., a full side view of the body of the animal) (and in some cases, also a top view image of the animal) for further processing, the angled orientation of the second sidewall 104 can be helpful to allow the imaging system 110 have a generally unobstructed field-of-view of the animal to capture substantially all of a side view of an animal's body while limiting (e.g., preventing) the animal from traversing the second sidewall 104. In other words, in some cases, animals are wider above their legs and the angled second sidewall 104 helps to keep the animal positioned in a consistent (e.g., predictable) location relative to the first sidewall (e.g., datum structure) 102 while also accommodating the wider upper region of the animal. In some embodiments, the second sidewall 104 is disposed at an angle α that is between about 100 degrees and about 145 degrees with respect to a floor surface. In some cases, the imaging system 110 can be located in a position that is closer to the top of the chute system. As discussed below, additionally or alternatively, additional imaging systems can be used so that one of the imaging systems provides a view that the other imaging system cannot see (e.g., a top view to compliment a side view). Such a configuration is expected to capture a more complete three dimensional image of the animal positioned within the chute system. The second imaging system is typically positioned on top of the chute system to capture a top view of the animal.

The height of the angled second sidewall 104 can be adapted for use with particular livestock animals. For example, cattle may require a greater height, while swine could use a lower height. In some embodiments, the angled second sidewall 104 has a height greater than a common height of the livestock with which the chute system 100 is used. In some embodiments, the second sidewall 104 has a height that is about 12 inches to about 48 inches (e.g., about 16 inches to about 24 inches). For example, in some embodiments in which the chute system is used to position pigs, the height of the second sidewall is about 12 inches to about 24 inches (e.g., about 16 inches to about 20 inches (e.g., about 18.79 inches)) and the second sidewall is positioned at an angle α that is about 120 degrees to about 135 degrees (e.g., about 128 degrees).

The structural wall components of the chute system 100 (e.g., the first sidewall 102, the second sidewall 104, and the end wall 106) can be in various forms or structural configurations. For example, in some embodiments, one or more of the wall components can be in the form of a frame-like structure comprising one or more beam-like members (e.g., tubes) that are interconnected with one another to form a wall. For example, in some embodiments, the chute system includes one or more wall components formed of multiple pieces of tubing fastened or otherwise joined to one another (e.g., welded or connected using adhesives). Alternatively or additionally, in some embodiments, one or more of the wall components (e.g., the first sidewall 102 in FIG. 3) can include fencing material 103 that can help limit (e.g., prevent) animals from leaving the chute system via the first sidewall 102).

Examples of suitable fencing material can include chain-link fencing, wire fencing, such as smooth wire fencing, barbed wire fencing, electric fencing, welded wire mesh fencing, woven wire fencing (e.g., fine wire mesh fencing like chicken wire or heavy wire mesh fencing like sheep fencing or ring fencing), or other types of fencing. Alternatively or additionally, one or more of the wall components can be formed of generally flat, planar plate-like wall members (e.g., substantially rigid sheet-like members). For example, as shown in FIG. 3, in some embodiments, the second sidewall 104 is formed of a substantially rigid sheet-like member. In particular, the second sidewall 104 can be formed of a sheet-like member to limit (e.g., prevent) the animal from traversing (e.g., climbing up or over) the second sidewall 104. Examples of suitable sheet-like members can include wood (e.g., plywood), sheet metal (e.g., flat sheet metal or corrugated sheet metal), plastic (e.g., rigid plastic materials), or members formed of multiple pieces (e.g., slats) of one or more of these materials that are interconnected to one another.

The chute system 100 can also include an animal anti-loitering device, which can include one or more devices or components that limit (e.g., prevent) an animal from remaining within the chute system 100 for extended periods of time (e.g., substantially longer time than required to determine characteristics associate with the animal). Various types of devices can be used to limit an animal from excessively loitering in the chute system. As discussed below, in some cases, the anti-loitering device can be in the form of a piece of material (e.g., a strip-like piece of material) fastened to the floor or ground on which the chute system is positioned. The piece of material can discourage an animal from wanting to lay down between the first and second sidewall since there would be less floor space for the animal to fit while the anti-loitering device could additionally apply safe levels of discomfort to the animal over elongated time periods. Alternatively or additionally, the anti-loitering device can include other types of devices, such as electrical, electromagnetic, mechanical, and/or thermomechanical devices. For example, in some examples, an auditory device can emit a sound wave to encourage the animal to leave the chute system. Alternatively or additionally, in some examples, a lighting device (e.g., a flashlight) can emit light into the chute system to encourage the animal to leave the chute system.

The chute system 100 also includes various components and devices with which the animal can interact within the chute system 100. For example, referring to FIG. 1, the chute system 100 can include one or more of an animal detection system 120, an animal identification system 140, an animal marking system 160, and an animal injection system (e.g., an automatic or semi-automatic injection system) 180. The various systems and devices within the chute system are typically in communication with a control system 200 that can operate the various systems to control the chute system 100.

As illustrated, in some embodiments, the animal detection system 120 is typically arranged within the chute system 100 (i.e., far into the chute beyond the entryway 108) to reduce the likelihood that the animal detection system 120 can be inadvertently activated by an animal that passes by the chute system 100 but does not fully enter the chute. However, in some embodiments, the detection system 120 can be located at any of various locations along the chute system 100 that enable suitable detection of the animals within the chute system 100.

The animal detection system 120 can include any of various systems and devices that are configured to detect that an animal is present within the chute system. For example, referring to FIG. 4, in some embodiments, the animal detection system 120 includes a feeder switch 122 that, when an animal enters the chute system and begins to feed (e.g., drink water or consume a food product), the feeder switch 122 can be triggered to send a signal to the control system 200 to indicate that an animal has entered the chute system 100 and processing of the animal can begin.

Figure 4:
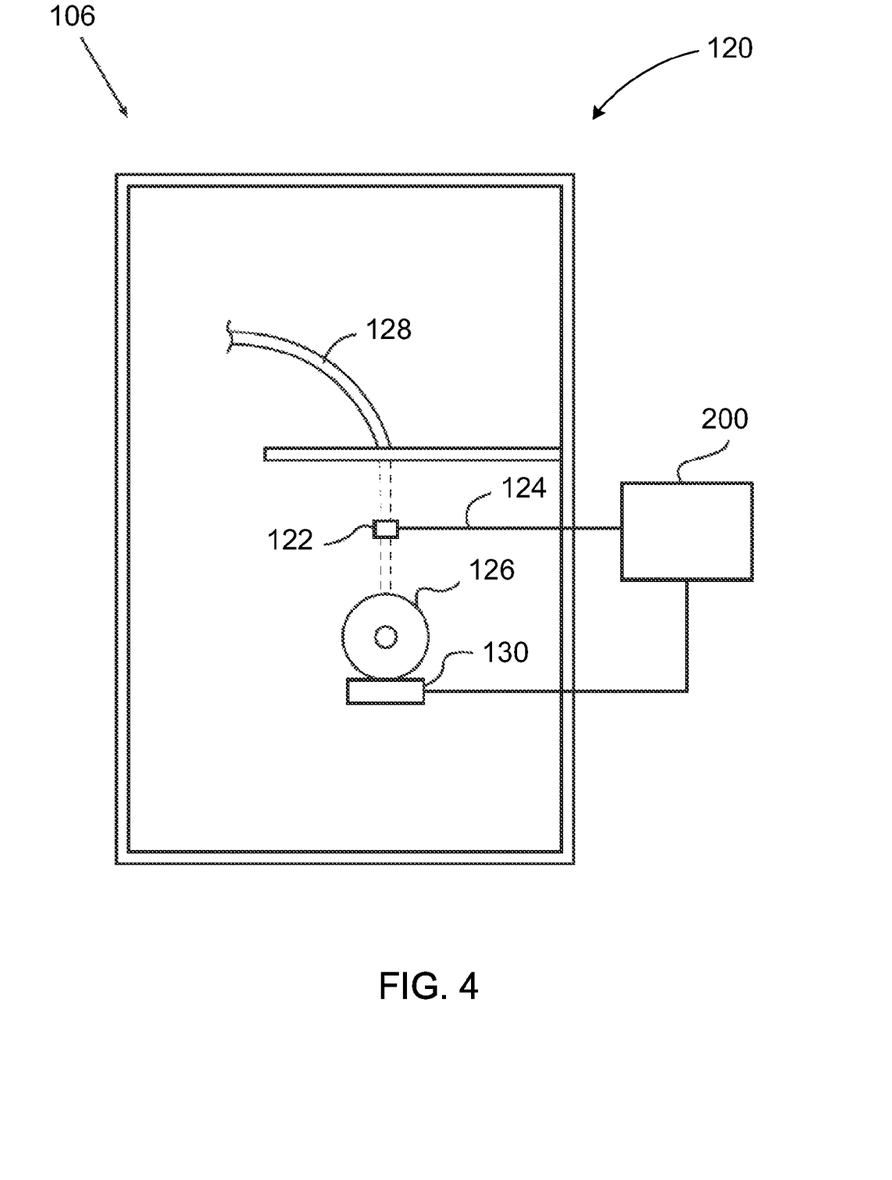
FIG. 4 is a schematic view of an example animal detection system having a feeder switch disposed on a wall of a chute system.

The feeder switch 122 can be configured to activate and send a signal to the control system 200 as a result of the animal entering the chute system and feeding from any of various different sources including drinking water or consuming a liquid or solid food source. For example, as illustrated in FIG. 4, the feeder switch 122 can be in the form of a liquid flow switch that is connected to an animal feeder (e.g., a liquid drinking nipple) 126 and can be in fluid communication with a liquid line (e.g., tubing) 128 connected to a liquid source (e.g., a water source). Using the animal detection system 120, when the animal enters the chute and drinks from the animal feeder 126, fluid begins to flow through the liquid line 128, which activates the feeder switch 122 so that a signal is sent to the control system 200. Once the animal detection system 120 indicates to the control system 200 that an animal is present within the chute system 100, the control system 200 can initiate any number of metric measuring routines, such as determining the animal's weight using the information obtained by the imaging system 110. Additionally or alternatively, the animal marking system 160 or the animal injection system 180 can also be used after presence of the animal is detected.

Alternatively or additionally, the animal detection system 120 can include any of various other types of devices that can suitably detect or determine the presence of an animal and indicate the same to the control system 200. For example, in some embodiments, the animal detection system 120 includes a proximity sensor, an infrared sensor, a motion detector, or other suitable devices that, upon detection of an animal within the chute system, can be activated to send a signal to the control system 200.

Alternatively or additionally, in some embodiments, the animal detection system 120 can include at least one device configured to view the chute system 100 and visually determine when an animal has entered the chute. For example, as discussed below, the imaging system 110 can be used to determine when an animal has entered the chute.

In some embodiments, a temperature sensor 130 is alternatively or additionally disposed on the control wall 106 to measure an animal's temperature (e.g., the animal's internal body temperature). As illustrated, in some examples, the temperature sensor 130 is arranged just below the animal feeder 126 along the control wall 106. The temperature sensor 130 can be in the form of any of various known temperature measuring devices that are configured to measure an animal's temperature noninvasively. Examples of such temperature sensors can include an infrared-based temperature sensing device.

The imaging system 110 can include any of various imaging devices that can suitably capture one or more images of the animal in the chute system. In some embodiments, the imaging system 110 can include a stereoscopic imaging device configured to capture multiple images (e.g., in some cases simultaneously) of the animal arranged within the chute system positioned using the first sidewall 102 and the second sidewall 104. For example, the imaging system 110 can include one or more of a stereoscopic video camera, charged-coupled-devices (CCD), a photodiode array, a complimentary metal-oxide semiconductor (CMOS) optical sensor, a still photographic camera, a digital camera, a conventional 2-dimension camera, or another type of imaging device.

In some cases, the imaging system 110 can include one or more of any number of filtering or lens controlling mechanisms. For example, an adapted lens can be used to limit the vertical and horizontal field-of-view of the imaging system, thereby manipulating (e.g., optimizing) an image area for image processing (e.g., for determining weight of the animal). The imaging system 110 can also include auto positioning and focusing systems or additional processing systems for performing image analysis including hardware components (e.g., an image processor) and/or software.

In some embodiments, referring to FIG. 2, the imaging system 110 includes a lighting device 112 to illuminate the field-of-view of the imaging system 110. The lighting device 112 is typically arranged to illuminate a broadside of the animal (e.g., the side view of the animal) when the animal is positioned within the chute system 100, for example, while feeding from the animal feeder 126. The lighting device 112 can include one or more of any various systems or devices configured to emit suitable light to illuminate the animal. For example, the lighting device 112 can include a linear array of lights, such as an array of monochromatic light emitting diodes (LEDs) with diffusers. In some embodiments, the lighting device 112 is alternatively or additionally disposed on the first sidewall 102, opposite the imaging system 110. Such an arrangement of the lighting device 112 opposite the imaging system 110 can enable the lighting device 112 to backlight the animal so that the imaging system 110 can capture a well-defined, contrasted image of the animal.

In some embodiments, the imaging system 110 can also be used as an animal detection device (e.g., the animal detection system 120). For example, the animal detection system 120 can include the imaging system 110, which can be operated (e.g., continuously operated) to monitor the chute system 100. Once an animal is detected, for example, when the imaging system 110 (i.e., in conjunction with the control system 200) detects motion of an object (e.g., an animal) within the chute system, a signal can be sent to the control system 200 that begins processing of the animal. For example, in some cases, once motion an animal is detected using the imaging system 110, the control system 200 can send a signal to the lighting device 112 to illuminate the animal so that an image can be captured and the animal's characteristics (e.g., weight) can be determined.

Additionally, in some embodiments, the chute system 100 includes an imaging calibration system that can be used to set up and calibrate the imaging system 110 for properly capturing images of an animal positioned in the chute system 100. The imaging calibration system can be a component of the imaging system 110 or a separate component with which the imaging system 110 can interact for calibration. As discussed below, in some embodiments, the calibration system can include a calibration block mounted on one of the sidewalls that the imaging system view and analyze for calibration.

The imaging system 110, alone or in combination with the control system 200, is typically used to capture images of animals within the chute to determine metrics associate with the animal. In particular, the imaging system 110 can capture a side view image (e.g., a three dimensional image) of an animal and, based on various algorithms executed by the imaging system 110 and/or the control system 200, estimate (e.g., determine) the weight of the animal. Additional description and details relating to the systems and methods for estimating an animal's weight based on a side view image of the animal can be found in co-pending application identified by Ser. No. 13/832/186, the contents of which are hereby incorporated by reference in their entirety.

While the chute systems have been described generally as having one imaging system 110 that can be used to analyze an animal present in a chute system, other configurations are possible. For example, in some embodiments, the chute system includes more than one imaging system 110 (e.g., two, three, four, five or more imaging systems) in communication with the control system 200 and/or the other imaging systems. As illustrated in FIG. 3, in some embodiments, a chute system includes two imaging systems 110, which can be positioned on the same side of an animal to capture multiple side views of the animal for image processing. Alternatively or additionally, in some embodiments, one or more imaging systems are positioned generally above the chute system in order to obtain a top view image of the animal. For example, animal characteristics can be determined using a combination of one or more side images and one or more top images of the animal in the chute system. Additional description and details related to this type of image processing and characteristic detection can be found in co-pending application identified by Ser. No. 13/832/186, the contents of which are hereby incorporated by reference in their entirety.

Referring back to FIGS. 1 and 2, the animal injection system 180 typically includes an injection unit 182 connected to one of the chute walls (e.g., the first sidewall 102). The injection unit 182 can include any of various devices configured to administer (e.g., inject) a substance into an animal positioned in the chute system. For example, the injection unit 182 can include a syringe device, a repeating injector, a multi-dose syringe, or other systems or devices configured to selectively inject a fluid into an animal, for example, in response to a command from the control system 200.

As illustrated, the injection unit 182 can be connected to the chute wall via a connection mechanism (e.g., a robotic arm) 184. The connection mechanism 184 can be configured to selectively move toward and away from an animal positioned between the first sidewall 102 and the second sidewall 104 during an injection procedure.

The animal injection system 180 is typically in communication with the control system 200 to send and receive signals (e.g., injection instructions) based on signals received from one or more other systems of the chute system 100. For example, in some embodiments, when an animal enters the chute system 100 and the imaging system 110 captures an image of the animal so that the animal's weight can be estimated (e.g., determined), an injection can be administered (based on instructions from the control system 200) in response to the determined weight of the animal. This can be beneficial since certain animals can be administered certain types of medical injections only if they have grown to a certain weight (e.g., a threshold weight). For example, if the chute system 100 determines that a pig positioned in the chute weighs at least 100 lbs (e.g., by capturing an image of the pig and processing the image as described above), the animal injection system 180 can inject the pig with certain substances (e.g., chemical castration substances). This can greatly increase the efficiency by which animals can be sorted and provided with necessary medications.

Referring back to FIG. 1, in some embodiments, the chute system 100 has an animal identification system 140 arranged along one of the chute walls (e.g., the first sidewall 102). The animal identification system 140 is configured to identify a particular animal that has entered the chute system 100. The animal identification system 140 can include one or more of various types of devices including scanners, transponder detectors, transceivers, or other types of suitable identification devices. For example, in some embodiments, the animal identification system 140 includes a radio-frequency identification (RFID) reader that is configured to communicate with and identify an RFID tag associated with an animal. For example, one or more animals in a particular area (e.g., within a pen or barn area) can each have their own RFID tag, which can be affixed to the animal, for example, affixed to the animal's ear or implanted under the animal's skin. Alternatively or additionally, in some embodiments, the animal identification system 140 can include devices to read an identifying marking applied to the animal. For example, the animal identification system 140 can include visual identification systems, such as barcode readers (e.g., a reader that can read a barcode or marking applied to the animal using a printer (e.g., an ink jet barcode printer or a stain printer), for example, printers manufactured by EBS Ink-Jet Systems USA, Inc of Libertyville, Ill.), configured to identify the animal based on markings applied to the animal. Alternatively or additionally, the animal identification system 140 can include a variety of other devices to read characters (e.g., numbers or letters (e.g., identification numbers)) printed on an animal. In some cases, the animal identification system 140 is configured to read any of various other types of inks or stains (e.g., semi-permanent stains (e.g., 20-24 week stains) or permanent stains) that have been applied to an animal (e.g., using a printer). Alternatively, in some embodiments, a user can manually enter the identity of the animal (e.g., by visual inspection of the animal or an identification tag on the animal). For example, the animal identification can be associated with an animal's lot or identification number, age, sex, breed, market classification, domestic information relating to growth hormones, and any other pertinent information relating to the animal. As discussed above, the animal identification system 140 is typically configured to communicate the animal identification to the control system 200 for use therein.

The animal marking system 160, referring to FIGS. 1 and 2, can also be disposed along one of the chute walls (e.g., the first sidewall 102 in the example illustrated) so that an animal within the chute system can be marked for one or various purposes. The animal marking system 160 is configured to mark or otherwise tag animals in the chute system with a visual identifier (e.g., an identifying marking) so that they can be distinguished from one another. For example, in some embodiments, the animal marking system 160 can mark animals with different colored paints or numbers for visual identification. In some embodiments, the animal marking system 160 comprises a device (e.g., a barcode printer) configured to apply a barcode to the animal. In some examples, the animal marking system 160 comprises a printer (e.g., an ink jet barcode printer or a stain printer), for example, printers manufactured by EBS Ink-Jet Systems USA, Inc of Libertyville, Ill. In some cases, the animal marking system 160 can apply a stain (e.g., a semi-permanent stain (e.g., a 20-24 week stain) or a permanent stain) to the animal. In some examples, the animal marking system 160 comprises a device (e.g., a printing device) configured to apply a string of characters (e.g., an identification number) to the animal.

Such visual identifiers applied by the marking systems for tagging or marking animals can be used for subsequent managing the animals (e.g., feeding or sorting the animals). The visual identifiers can be applied based upon a determined weight of an animal as determined using the imaging system 110. For example, if an animal's weight is greater than a predetermined threshold weight, the animal marking system 160 can apply (e.g., spray) a predetermined indicator (e.g., a mark of a predetermined colored) on the animal to serve as a visual indicator that the animal has achieved the threshold weight and can be dispositioned accordingly (e.g., to receive certain medical treatments, or proceed to processing (e.g., slaughter)).

In some embodiments, the animal marking system 160 includes a marking device (e.g., a painting device or barcode application device, as described above) 162, which can be attached to the chute wall with a connection mechanism (e.g., a robotic arm) 164. The connection mechanism 164 is typically in communication with the control device 200 and configured to selectively move toward and away from an animal positioned in the chute system for marking the animal. The connection mechanism 164 can include any of various systems or devices configured to move the marking device 162 and can be similar or substantially the same as the connection mechanism 184 discussed above.

Figure 5:
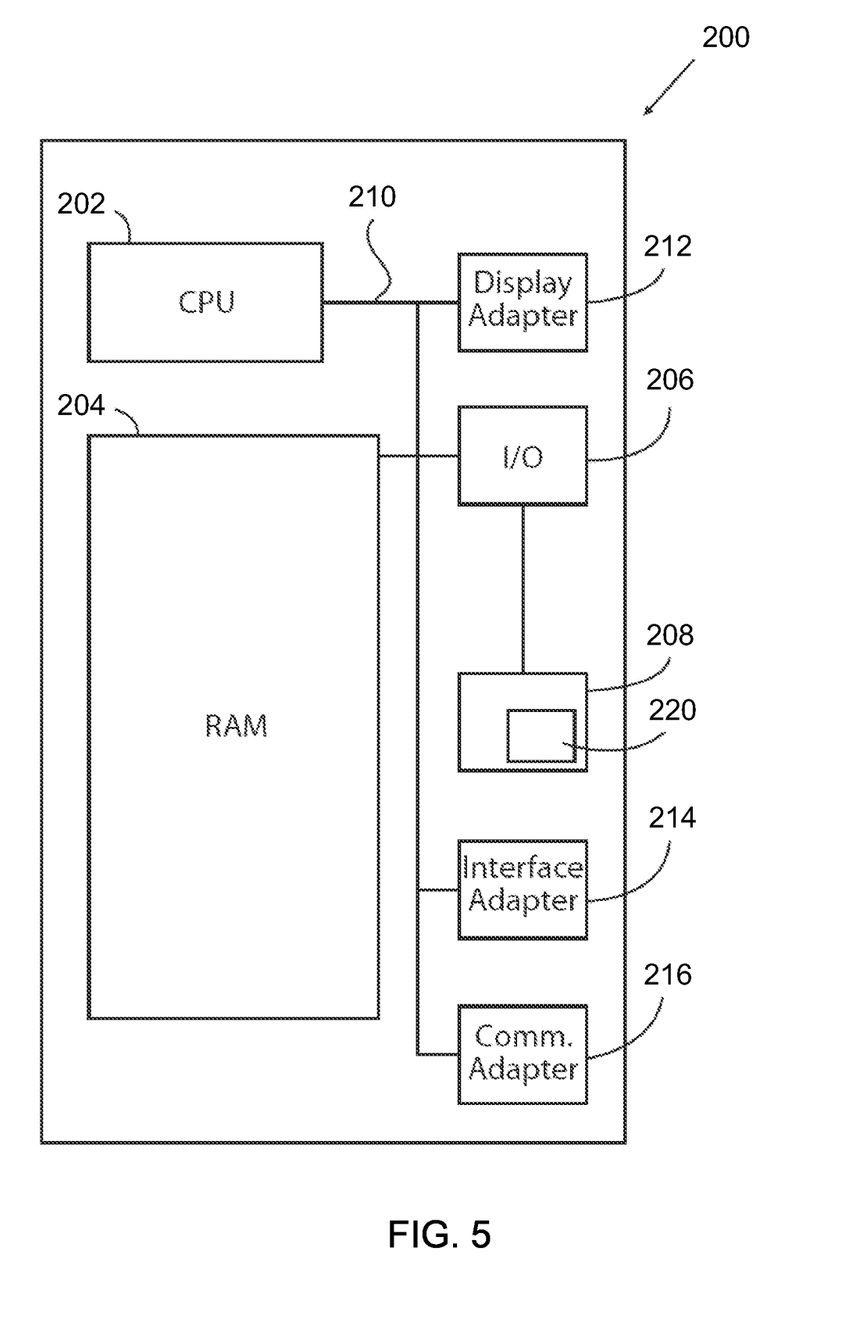
FIG. 5 is a schematic diagram of an example control system for operating an example chute system.

FIG. 5 schematically shows an exemplary embodiment of the control device 200. As shown, the control device 200 typically includes a central processing unit (CPU) 202, random access memory (RAM) 24, input/output circuitry 206 for connecting peripheral devices such as a non-transitory storage medium 208 to a system bus 210, a display adapter 212 for connecting the system bus 210 to a display device, a user interface adapter 214 for connecting user input devices, such as a keyboard, a mouse, and/or a microphone, to the system bus 210, and a communication adapter 216 for connecting the control device 200 to a network. In some embodiments, the communication adapter 216 is a wireless adapter. The storage medium 208 is configured to store, access, and modify a database 220, and is preferably configured to store, access, and modify structured or unstructured databases for data including, for example, relational data, tabular data, audio/video data, and graphical data. Embodiments of the control device 200 can include additional components such as a high speed clock, analog to digital and digital to analog circuitry, and buffer circuitry and devices for appropriate signal conditioning.

The central processing unit 202 is typically a general-purpose microprocessor or central processing unit and has a set of control algorithms, comprising resident program instructions and calibrations stored in the memory 204 and executed to provide the desired functions. As one skilled in the art would recognize, the central processing unit 202 executes functions in accordance with any one of a number of operating systems including proprietary and open source system solutions. In some embodiments, an application program interface (API) is preferably executed by the operating system for computer applications to make requests of the operating system or other computer applications. The description of the central processing unit 202 is meant to be illustrative, and not restrictive to the disclosure, and those skilled in the art would appreciate that the disclosure may also be implemented on platforms and operating systems other than those mentioned.

In some embodiments, the input/output circuitry 206 includes various connection ports for connecting the animal detection system 120, the imaging system 110, the injection system 180, various sensors, the animal identification system 140, and/or the animal marking system 160. In some embodiments, the animal detection system 120, the imaging system 110, the injection system 180, various sensors, the animal identification system 140, and/or the animal marking system 160 are network enabled components configured to communicate via the communication adapter 216.

Figure 6:
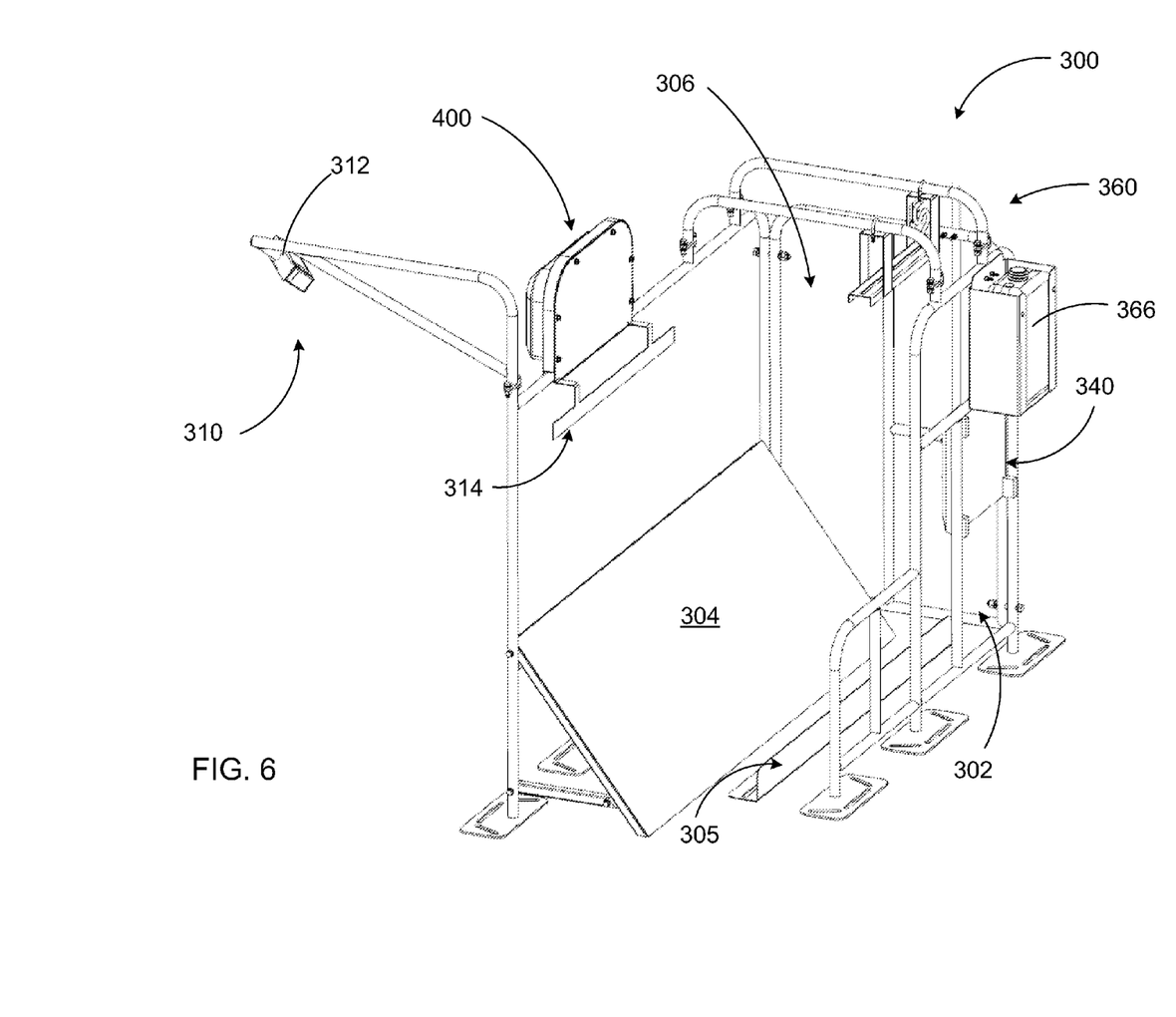
FIG. 6 is a perspective view of an example chute system for consistent positioning and imaging of an animal.
Figure 7:
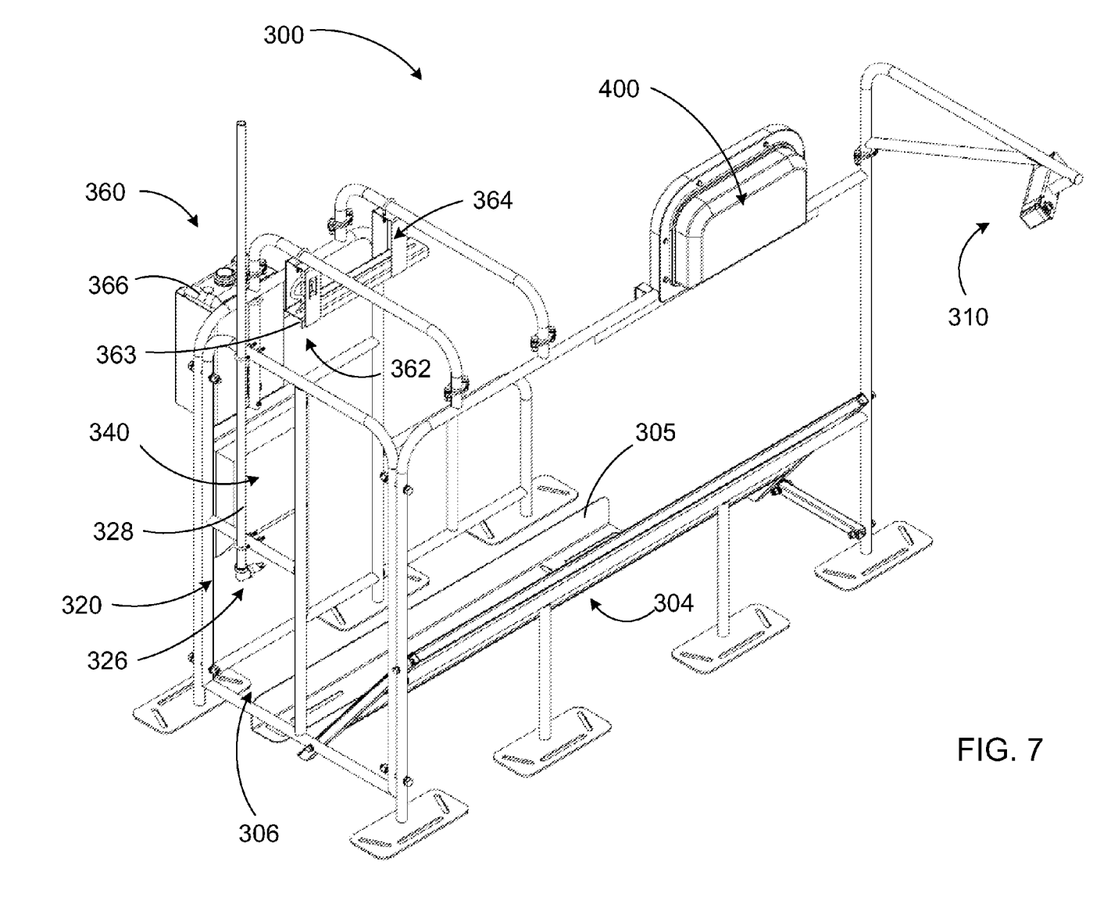
FIG. 7 is an alternative perspective view of the chute system of FIG. 6.
Figure 8:
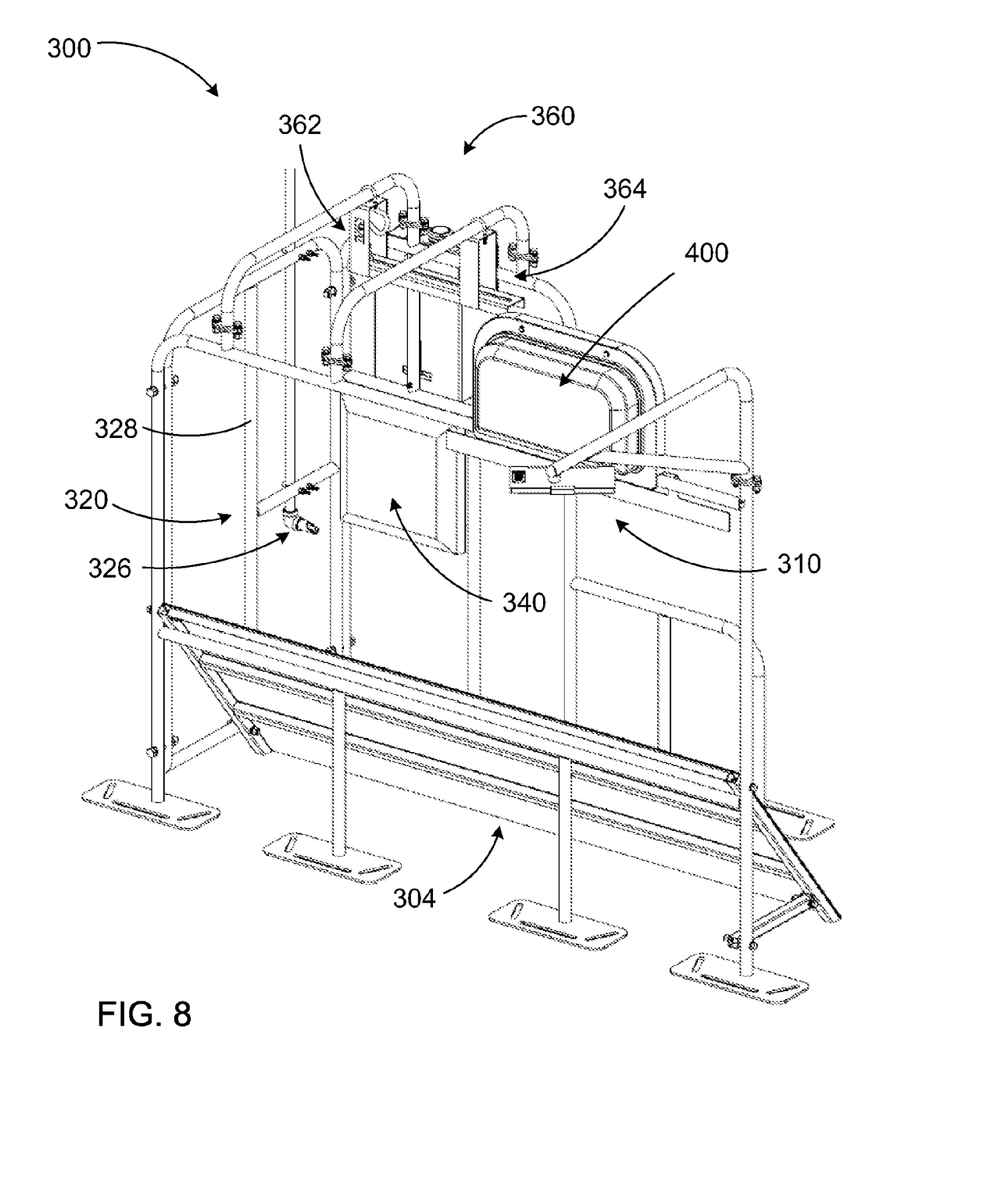
FIG. 8 is an alternative perspective view of the chute system of FIG. 7 illustrating a field of view of an imaging system of the chute system.

As discussed above, the chute system can be carried out in any of various configurations having any number of various combinations of components and systems. Referring to FIGS. 6-8, in some embodiments, a chute system 300 can include a frame structure that generally serves as a mounting location for the various systems and components of the chute system. As illustrated, the frame structure can be formed of a first sidewall 302, a second sidewall 304, and an end wall 306. Each of the sidewalls can include one or more of the various features or compositions described above with respect to the sidewalls of the chute system 100 (e.g., the first sidewall 102, the second sidewall 104, and/or the end wall 106).

As illustrated, the first sidewall 302 and the end wall 306 can be in the form of one or more tubular members that are interconnected, for example, using fasteners or connections using welding or adhesives. In some examples, the tubular members are formed of stainless steel. In some cases, hollow, tubular members are used so that various wiring (e.g., wiring that interconnects the various systems) can be packaged and arranged within the tubular member to limit interference or damage. The second sidewall 304, as discussed above, can be in the form of a generally flat sheet of material (e.g., sheet metal) to limit the animal from traversing the second sidewall 304. Similar to the chute system 100, the positioning and configuration of the first and second sidewalls is such that an animal that enters the chute system 300 is typically consistently positioned within chute system 300 so that consistent images of the animal can be captured for processing, such as determining characteristics of the animal (e.g., weight of the animal).

The chute system 300 can also include an animal anti-loitering device 305, which can include one or more devices or components that limit (e.g., prevent) an animal from remaining within the chute system 300 for extended periods of time (e.g., substantially longer time than required to determine characteristics associated with the animal). For example, in some embodiments, the animal anti-loitering device 305 includes a strip-like member that can be affixed to a floor surface between the first and second sidewalls and protrude upward. The animal anti-loitering device 305 is generally positioned so that the animal in the chute system can place their feet (e.g., hooves) on both sides of the anti-loitering device 305 (e.g., their right feet on the right side and their left feet on the left side). However, since the anti-loitering device 305 protrudes upward from a floor surface on which it is mounted, an animal is typically discouraged from lying on the floor between the first and second sidewall. This is expected to limit (e.g., prevent) animals from excessively laying in the chute system, which could result in other animals being unable to be processed by the chute system.

The chute system 300 includes one or more systems that can be substantially similar to the various systems described above with respect to the chute system 100 for determining characteristics of the animal. For example, in some embodiments, the chute system 300 includes an imaging system 310, an animal detection system 320, an animal identification system 340, and an animal marking system 360, which all can be in communication (e.g., wired or wireless communication) with a control system (e.g., a control system similar to the control system 200 discussed above) 400. In some embodiments, the chute system 300 also includes an animal injection system, as discussed above, which is not illustrated in FIGS. 6-8.

The imaging system 310 can generally include one or more of the various components or features described above with respect to the imaging system 110. For example, the imaging system 310 can include an imaging device (e.g., a camera device) 312 that is configured to capture images of an animal positioned between the first and second sidewalls. In some cases, the imaging device 312 includes a three-dimensional camera (e.g., a camera device having a VGA video camera and a depth sensor (e.g., having an infrared projector and a monochrome CMOS sensor)) configured to capture a three-dimensional image of an animal positioned in the chute system 300. For example, in some embodiments, the Kinect® camera device from Microsoft®, camera sensor devices by PrimeSense of Los Altos, Calif., or camera sensor devices by Point Grey Research Inc of Richmond, BC, Canada can be used to capture images of the animal. The three-dimensional image can be used by the imaging system 310 and/or the control system 400 to determine (e.g., estimate) characteristics (e.g., weight) of the animal in the chute system 300, as discussed above. As mentioned above, in some embodiments, the chute system includes more than one (e.g., two, three, four, or more) imaging systems 310 (or imaging devices 312) which can be used in combination to determine the characteristics of the animal.

As illustrated, in some embodiments, the imaging system 310 also includes a calibration device (e.g., a calibration block or a stick of a known size and position relative to other components of the chute system (e.g., the first or second sidewall)) 314 that can be used for setting up and calibrating the imaging device 312. Such an object can be processed in 3D to determine to the location of the chute system relative to the imaging system 310. For example, in some embodiments, the calibration block can include a visual pattern including a series black and white images (e.g., squares or stripes) that, when viewed by the imaging device, enables the imaging system 310 to determine its position relative to the calibration block 314 and therefore also the frame structure of the chute system 300. Such a calibration technique typically enables simpler and less precise (e.g., less complex and expensive) positioning and orientation of the imaging device 312 (e.g., the direction in which the camera is aimed) than may otherwise be required if the imaging device would need to be accurately set up positioned relative to the frame structure without further calibration techniques.

As mentioned above with respect to the imaging system 110, the imaging system 310 can also include one or more illumination devices configured to generate and direct light towards an animal in the chute system in any of various different configurations. For example, in some embodiments, the illumination devices are used to illuminate the side of the animal of which the image is being taken. Additionally or alternatively, the illumination devices can be used to backlight the animal for imaging.

The animal detection system 320 (illustrated more particularly in FIGS. 7 and 8) can be similar to the animal detection system 120 discussed above with respect to the chute system 100. For example, as illustrated, the animal detection system 320 can include a feeder switch connected to an animal feeder (e.g., a drinking nipple) 326 arranged along the end wall 306. As illustrated, the animal feeder 326 can be fluidly connected to a fluid line 328 that is connected to an external fluid source (e.g., a water tank or reservoir). Similar to the animal detection system 120, the animal detection system 320 can include a feeder switch (e.g., a flow switch arranged within the fluid line 328) that, when an animal drinks from the animal feeder 326, a signal is sent to the control system 400 to indicate that an animal is present within the chute system 300.

Alternatively or additionally, in some cases, the imaging system 310 can be used as an animal detection system. For example, as discussed above, the imaging device 312 can be automatically operated periodically or substantially continuously (e.g., continuously) and when an animal is detected in the chute system 300 (e.g., when motion is detected within the field-of-view of the imaging device 312), the control system 400 can determine that an animal is present within the chute system to begin processing. In some examples, once an animal is detected, the control system 400 can instruct one or more illumination devices to illuminate the chute system 300 and instruct the imaging device 312 to capture an image for processing.

The animal identification system 340 is configured to identify one or more animals within the chute system 300 based on any number of different factors or criteria, as discussed above with respect to the animal identification system 140. In some embodiments, the animal detection system 340 includes at least an information reading device, such as a wireless reading device (e.g., an RIFD reading device) that is configured to communicate with (e.g., read) information tags (e.g., RFID tags) affixed in or on different animals. For example, animals can have an RFID tag attached to one or more parts of their bodies (e.g., their ears). The animal identification system 340 is in communication with the control system 400 so that the control system 400 can know when a particular animal is in the chute system 300 (e.g., as a result of the detection system 340 reading an RFID tag associated with the animal) and can associate the determined characteristics with the particular animal. In some cases, the control system 400 can, either on its own or in connection with an external computing system, track characteristics of animals, as well as track various markings applied to the animal or injections administered to the animals using the chute system 300 or other devices.

While the animal identification system 340 has generally been described as having an RFID system, other configurations and devices are possible, for example, at least those described above with respect to the animal identification system 140. For example, in some embodiments, the animal identification system can identify the animal by reading an identifying marking (e.g., characters (e.g., text or numbers) or barcodes applied onto the animal (e.g., on the side of a pig)) using the animal marking system, for example, using a writing device, such as those by EBS Ink-Jet Systems (e.g., a ink jet system or a device to apply a stain to the animal). Alternatively or additionally, in some cases, the imaging system (e.g., imaging system 110 or imaging system 310) can serve as the animal identification system, for example, by reading such characters or barcode applied to the animal. For example, in some cases, using one of various commonly used optical character recognition (OCR) techniques, the imaging device can read the characters used as an identifier when the characters are unique to the animal.

The animal marking system 360 can include any of various systems or devices configured to apply a marking (e.g., an identifying marking) to an animal (e.g., along the animal's skin) while the animal is positioned within the chute system 300. For example, the animal marking system 360 can include one or more of at least the various devices discussed above with respect with to the animal marking system 160. For example, in some embodiments, the animal marking system 360 comprises a device (e.g., a barcode printer) configured to apply a barcode or other characters to the animal. In some examples, the animal marking system 360 comprises a printer (e.g., an ink jet barcode printer or a stain application device (e.g., stain printer)), for example, printers manufactured by EBS Ink-Jet Systems USA, Inc of Libertyville, Ill. In some cases, the animal marking system 360 can apply a stain (e.g., a semi-permanent stain (e.g., a 20-24 week stain) or a permanent stain) to the animal. In some cases, the animal marking system 360 can apply a string of characters (e.g., an identification number) to the animal.

In some embodiments, as illustrated in FIGS. 6-8 (more particularly in FIG. 7), the animal marking system 360 can include a marking device (e.g., the barcode printer or stain application device) 362 including a marking nozzle (e.g., a movable or articulating nozzle) 363 that is connected to the frame using a connection mechanism (e.g., an articulating rack device) 364. In some cases, the connection mechanism 364 is in the form of an electromechanical articulating device (e.g., electromagnetic device) or a pneumatic articulating device in communication with the control system 400 to move the marking nozzle 363.

In some embodiments, the marking nozzle 363 includes a paint sprayer that is configured to apply a paint marking to an animal within the chute system 300. The marking nozzle 363 can be connected to a reservoir (e.g., a paint tank) 366 that supplies paint to be used to mark an animal. In some cases, as discussed above with respect to the chute system 100, when an animal enters the chute system and a characteristic of the animal (e.g., weight) is obtained, a corresponding mark can be applied based on the characteristic. For example, animals of a certain threshold weight can be marked so that they can be separated from other animals in a common pen.

The chute system 300 can also include an animal injection system, which is not illustrated in FIGS. 6-8. The animal injection systems used with the chute system 300 can include at least one or more of the various components and features described above with the respect to the animal injection system 180 of chute system 100.

The chute systems described herein (e.g., the chute system 100, the chute system 300, or any suitable combination of any of the components described in these examples) can typically be used in a pen or other animal loitering area. In this way, animals typically do not need to be corralled, pushed, or forcefully guided into the chute. The chute system is configured to enable animals to move in and out freely, reducing stress on the animals and decreasing labor workload for the farm. When the animal enters the chute system, an animal identification system (e.g., the identification system 140 or the identification system 340) can identify the animal (e.g., by reading an RFID tag) and communicate the identification information to a control system (e.g., the control system 200 or the control system 400). The animal detection system can detect the animal being properly positioned within the chute system (e.g., as a result of the animal feeding from the feeder 126 or the feeder 326), a switch (e.g., the feeder switch 122) can be triggered and the animal's presence can be indicated to the control system. The control system can then instruct an imaging system (e.g., the imaging system 110 or the imaging system 310) to capture an image of the animal and transmit the image information to the control system for storage and analysis (e.g., to determine an animal weight and/or mass characteristic metric). For example, a three-dimensional image of an animal profile may be captured and transmitted to the control system. The control system can then determine a mass or weight of the animal based upon the three-dimensional image. Additionally, upon detection and indication of the animal's presence, the control system can monitor various other devices or sensors to measure various other animal metrics, such as temperature. In addition to obtaining animal metrics, the chute system may also mark an animal or execute a fluid injection. For example, an animal marking device (e.g., the marking device 160 or the marking device 360) can mark or otherwise tag each animal with an identifier as it exits the system or while the animal is feeding. For example, as discussed above, the animal marking device can mark the exiting animals with different color paints for visual identification. In some embodiments, the animal marking device can add electronic information to electronic ear tags (RFID tags) on the animals, can add visual information to non-electronic ear tags on the animals, or can provide other identifiers by which individual animals can be identified later. Such identification devices for tagging or marking animals are known in the art and can be used for later managing, feeding, and sorting the individual animals.

Additionally, as described herein above, the chute system may administer medicines, topical insecticides, anti-parasite drugs, and other fluids into an animal based upon the animal identification. Injection schedules may be indexed in the control system and associated with particular animals or groups of animals. When an animal enters the chute system and an animal identification system (e.g., the identification system 140 or the identification system 340) identifies the animal (e.g., by reading an RFID tag), the control system may then control an animal injection system (e.g., the injection system 180, for example, using the connection mechanism (e.g., the robotic arm) 184.

Once analysis of the animal is complete, the animal can voluntarily exit the chute system, for example, by walking out. In some cases, since the chute system is typically open ended, the animal may exit the chute system before processing is complete, so the control system may remember (e.g., by storing to data) the amount of processing that has been completed so that when the animal re-enters the chute system, processing may resume accordingly.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. An animal positioning system comprising:
    a first positioning member; and
    a second positioning member positioned relative to the first positioning member configured to limit an available spacing along a floor surface between the first positioning member and the second positioning member, the second positioning member being arranged at an angular bias away from the first positioning member relative to a floor surface and being configured to permit unobstructed viewing of a body of an animal positioned in the available spacing.

2. The animal positioning system of claim 1, wherein the positioning system is configured to permit the animal to voluntarily enter and exit the available spacing.

3. The animal positioning system of claim 1, wherein the positioning system is open-ended.

4. The animal positioning system of claim 1, wherein the first positioning member comprises a first wall structure and the second positioning member comprises a second wall structure.

5. The animal positioning system of claim 4, wherein the second wall structure is positioned at an angular bias away from the first wall structure relative to the floor surface to permit the unobstructed viewing of the body of the animal positioned in the available spacing.

6. The animal positioning system of claim 5, wherein the second wall structure comprises a plate-like element configured to limit the animal from traversing the second wall structure.

7. The animal positioning system of claim 5, wherein the angular bias comprises the second wall structure being arranged at an angle that is 100 degrees to 145 degrees relative to the floor surface.

8. The animal positioning system of claim 7, wherein the angular bias comprises the second wall structure being arranged at an angle that is 120 degrees to 135 degrees relative to the floor surface.

9. The animal positioning system of claim 4, wherein a positioning of a lower region of the first sidewall relative to a lower region of the second sidewall limits more than one animal from entering the chute system at a particular time.

10. The animal positioning system of claim 9, wherein a spacing between the lower region of the first sidewall and the lower region of the second sidewall is associated with a typical width of a type of animal entering the chute system.

11. The animal positioning system of claim 9, wherein the positioning of the lower portion of the first sidewall relative to the lower portion of the second sidewall limits the animal's ability to position itself relative to an imaging device of the positioning system.

12. The animal positioning system of claim 1, further comprising an imaging system configured to capture an image of the body of the animal positioned in the available spacing via the unobstructed viewing.

13. The animal positioning system of claim 12, further comprising a control system in communication with the imaging system.

14. The animal positioning system of claim 12, further comprising an animal detection system configured to determine that the animal is positioned in the available spacing for imaging by the imaging system.

15. The animal positioning system of claim 14, wherein the animal detection system comprises one or more components of the imaging system.

16. The animal positioning system of claim 14, wherein the animal detection system comprises a device configured to be activated by the animal feeding from the device.

17. The animal positioning system of claim 1, further comprising an animal identification system configured to identify the animal positioned in the available spacing based on an identifying feature associated with the animal.

18. The animal positioning system of claim 17, wherein the animal identification system comprises a wireless data reading device.

19. The animal positioning system of claim 1, further comprising an animal injection system configured to administer a substance to the animal.

20. The animal positioning system of claim 1, further comprising an animal marking system configured to apply a mark to the animal associated with a characteristic of the animal.

21. The animal positioning system of claim 20, wherein the animal marking system comprises a device configured to apply an identifying marking to the animal.

22. The animal positioning system of claim 21, wherein the device configured to apply the identifying marking comprises a printer device.

23. A livestock animal chute comprising:
    a frame structure;
    an animal positioning area defined by:
        a first sidewall of the frame structure; and
        a second sidewall of the frame structure disposed relative to the first sidewall, the second sidewall being angled relative to a floor surface to enable a field of view of the animal positioning area;
    an animal detection system configured to determine when an animal is positioned in the animal positioning area;
    an imaging system positioned relative to the frame structure configured to capture an image of an animal in the animal positioning area; and a control system configured to i) operate the imaging system and the animal detection system and ii) estimate a weight of the animal based on the image captured by the imaging system.

24. A method for estimating a characteristic associated with an animal, the method comprising:

determining the animal's presence within a target area of an animal positioning system having a first positioning member and a second positioning member positioned relative to the first positioning member, the second positioning member being arranged at an angular bias away from the first positioning member relative to a floor surface and being configured to permit unobstructed viewing of a body of an animal positioned in the available spacing;

responsive to determining the animal's presence within the target area, capturing an image of the animal; and processing the image to estimate the characteristic associated with the animal.

25. The method of claim 24, wherein the characteristic comprises a weight of the animal.

26. The method of claim 24, further comprising identifying the animal according to identifying information associated with the animal.

27. The method of claim 24, further comprising, responsive to determining that the characteristic meets a threshold characteristic level, administering a substance to the animal.

28. The method of claim 27, wherein administering a substance comprising injecting the animal with a substance.

29. The method of claim 24, further comprising, responsive to determining that the characteristic meets a threshold characteristic level, applying an identifying mark to the animal.

30. The method of claim 29, wherein applying the identifying mark comprises applying a barcode mark.

* * * * *